United States Patent
Liu et al.

(10) Patent No.: US 12,504,503 B2
(45) Date of Patent: Dec. 23, 2025

(54) ARRAY ANTENNA AND MAN-MACHINE INTERACTION APPARATUS

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Feng Qu, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 338 days.

(21) Appl. No.: 18/027,749

(22) PCT Filed: May 30, 2022

(86) PCT No.: PCT/CN2022/095900
§ 371 (c)(1),
(2) Date: Mar. 22, 2023

(87) PCT Pub. No.: WO2023/230752
PCT Pub. Date: Dec. 7, 2023

(65) Prior Publication Data
US 2024/0302489 A1    Sep. 12, 2024

(51) Int. Cl.
*G01S 7/03* (2006.01)
(52) U.S. Cl.
CPC ..................... *G01S 7/03* (2013.01)
(58) Field of Classification Search
CPC . G01S 7/03; G01S 7/415; G01S 13/42; G01S 7/027; G01S 7/032; G01S 7/35;
(Continued)

(56) References Cited

U.S. PATENT DOCUMENTS 8,466,829 B1 * 6/2013 Volman ............... G01S 3/48
342/149
9,755,874 B2   9/2017 Feher
(Continued)

FOREIGN PATENT DOCUMENTS

CN        102135629 A    7/2011
CN        105050144 A    11/2015
(Continued)

OTHER PUBLICATIONS

CN109116309A_Description_20250409_1231.pdf—translation of CN109116309A (Year: 2019).*
CN109116309A_fig1_translate.pdf (Year: 2019).*

*Primary Examiner* — Bernarr E Gregory
*Assistant Examiner* — Yonghong Li
(74) *Attorney, Agent, or Firm* — HOUTTEMAN LAW LLC

(57) ABSTRACT

An array antenna includes M number of first array elements, N number of second array elements, at least one first link and at least one second link, where M≥2, and/or N≥2, and both of M and N are positive integers; where in a case where M≥2, at least two of the M number of first array elements are connected to corresponding first switch units, respectively; and at least two of the first array elements electrically connected to the first switch units are electrically connected to a same first link; and/or in a case where N≥2, at least two of the N number of second array elements are connected to corresponding second switch units, respectively; and at least two of the second array elements electrically connected to the second switch units are electrically connected to a same second link.

16 Claims, 7 Drawing Sheets

(58) Field of Classification Search
CPC .... G01S 7/417; G01S 2013/0263; G06F 3/01; H01Q 21/0006; H01Q 21/06
See application file for complete search history.

(56) References Cited

U.S. PATENT DOCUMENTS

| | | | |
|---|---|---|---|
| 10,446,938 B1* | 10/2019 | Wang | H01Q 9/0407 |
| 10,698,079 B2* | 6/2020 | Kushnir | H01Q 3/36 |
| 10,812,154 B1* | 10/2020 | Elad | G01S 13/42 |
| 2016/0291146 A1* | 10/2016 | Wang | G01S 13/867 |
| 2019/0049572 A1 | 2/2019 | Hong et al. | |
| 2019/0162834 A1* | 5/2019 | Al-Alusi | G01S 13/88 |
| 2020/0411984 A1* | 12/2020 | Fitzgerald | H01Q 1/246 |
| 2021/0096216 A1* | 4/2021 | Rigazio | G06F 18/25 |
| 2021/0365778 A1* | 11/2021 | Dey | G06V 10/454 |
| 2022/0102870 A1* | 3/2022 | Liu | H01Q 1/44 |

FOREIGN PATENT DOCUMENTS

| | | | | |
|---|---|---|---|---|
| CN | 107957574 A | | 4/2018 | |
| CN | 108627828 A | | 10/2018 | |
| CN | 109116309 A | * | 1/2019 | ............ G01S 7/28 |
| CN | 110740200 A | | 1/2020 | |
| CN | 113495267 A | | 10/2021 | |
| CN | 215266689 U | | 12/2021 | |
| CN | 114267954 A | | 4/2022 | |
| JP | 2003315447 A | | 11/2003 | |
| JP | 2010156708 A | | 7/2010 | |

* cited by examiner

ARRAY ANTENNA AND MAN-MACHINE INTERACTION APPARATUS

TECHNICAL FIELD

The present disclosure relates to the field of communication technology, and particularly relates to an array antenna and a man-machine interaction apparatus.

BACKGROUND

The non-contact sensing technology plays an increasingly important role in the field of human-computer interaction. At present, the non-contact sensing can be realized by a plurality of methods, including machine vision, ultrasound, millimeter waves, and the like. Sensing based on millimeter waves has become a technology and market hotspot because it is not influenced by ambient light, can protect privacy and has a wide interaction range. However, the resolution of the millimeter waves is closely related to the working frequency and the number of antenna array elements. In order to obtain a high angle resolution, the most direct method is to increase the number of antenna array elements, which, however, results in a direct consequence of high system overhead.

SUMMARY

The present disclosure aims to solve at least one technical problem in the prior art and provides an array antenna and a man-machine interaction apparatus.

An embodiment of the present disclosure provides an array antenna, including M number of first array elements, N number of second array elements, at least one first link and at least one second link, where M≥2, and/or N≥2, and both of M and N are positive integers; where in a case where M≥2, at least two of the M number of first array elements are connected to corresponding first switch units, respectively; and at least two of the first array elements electrically connected to the first switch units are electrically connected to a same first link; and/or in a case where N≥2, at least two of the N number of second array elements are connected to corresponding second switch units, respectively; and at least two of the second array elements electrically connected to the second switch units are electrically connected to a same second link.

In a case where M≥2, all of the M number of first array elements are electrically connected to a same first link, and a corresponding one of the first switch units is electrically connected between each of the M number of first array elements and the first link.

In a case where N≥2k, and k≥1, every two of the N number of second array elements are electrically connected to a corresponding one of the at least one second link, the second array elements connected to different second links are different, and a corresponding one of the second switch units is electrically connected between each of the N number of second array elements and the second link electrically connected to the second array element.

The N number of second array elements are sequentially arranged along a first direction from a $1^{st}$ one to an $N^{th}$ one; and an $1^{th}$ second array element and an $(i+N/2)^{th}$ second array element are electrically connected to a same second link, where i is in a range from 1 to N/2.

In a case where N≥2k, and k≥2, every two of the N number of second array elements are electrically connected to a first branch, and the second array elements connected to different first branches are different; and a corresponding one of the second switch units is electrically connected between each of the N number of second array elements and the first branch electrically connected to the second array element; the first branch is electrically connected to the second links corresponding to the first branch, and at least two of the first branches are electrically connected to a same second link; and for the first branches electrically connected to the same second link, a third switch unit is connected between each of the first branches and the second link electrically connected to the first branch.

The third switch unit includes any one of a thin film transistor, a micro-electro mechanical system switch, or a photodiode.

The first switch unit and the second switch unit each include any one of a thin film transistor, a micro-electro mechanical system switch, or a photodiode.

The first array element and the second array element each include a radiation patch or a dipole.

In a second aspect, an embodiment of the present disclosure provides a man-machine interaction apparatus, which includes any one of the array antennas described above.

The man-machine interaction apparatus further includes:
  a data processing module configured to determine a human body action and a corresponding control instruction according to a radar signal transmitted by the array antenna and an echo signal received, and to output the control instruction; and
  a display module configured to display the determined human body action and/or the control instruction.

The display module includes a display device, and the array antenna is integrated in the display device.

The display device has a display area and a peripheral area surrounding the display area; and the array antenna is integrated in the peripheral area.

The peripheral area includes a first area and a second area opposite to each other along a first direction, and a third area and a fourth area opposite to each other along a second direction; M≥2, and N≥2; the M number of first array elements are in the first area and arranged side by side along the second direction; and the N number of second array elements are in the third area and arranged side by side along the first direction.

The peripheral area includes a first area and a second area opposite to each other along a first direction, and a third area and a fourth area opposite to each other along a second direction; M≥2, and N≥2; the first area and the second area are both provided with the first array elements, and the third area and the fourth area are both provided with the second array elements.

The display device has a display area and a peripheral area surrounding the display area; the array antenna includes a metal mesh structure; and the array antenna is in the display area.

The data processing module includes a first processing core and a second processing core;
  the first processing core is configured to perform analysis operations according to a signal obtained by mixing the radar signal and the echo signal, and generate information of reflecting object, where the analysis operations include at least one of one-dimensional Fourier transform, two-dimensional Fourier transform, and angle-of-arrival calculation; and
  the second processing core is configured to perform chirp control on the radar signal, pre-train and generate a human body action recognition network, recognize the human body action through the human body action recognition network according to the information of reflecting object, and determine the corresponding control instruction.

The data processing module includes a low noise amplifier, a mixer, an intermediate frequency amplifier, an analog-to-digital converter, a digital front end component, a buffer, a power amplifier, a power divider and a waveform generator;

the low noise amplifier, the mixer, the intermediate frequency amplifier, the analog-to-digital converter, the digital front end component and the buffer are sequentially connected together;

the waveform generator, the power divider and the power amplifier are sequentially connected together; and an input terminal of the mixer is further connected to the power divider, an input terminal of the low noise amplifier is connected to the array antenna, and an output terminal of the power amplifier is connected to the array antenna.

The man-machine interaction apparatus further includes a printed circuit board, where the first link and the second link are bonded to the printed circuit board.

The printed circuit board includes a first printed circuit and a second printed circuit board; the first link is bonded and connected to the first printed circuit board; and the second printed circuit board is bonded and connected to the second printed circuit board.

The man-machine interaction apparatus includes any one of smart home device, vehicle-mounted device, health monitoring device and consumer electronics device.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Figure 1:
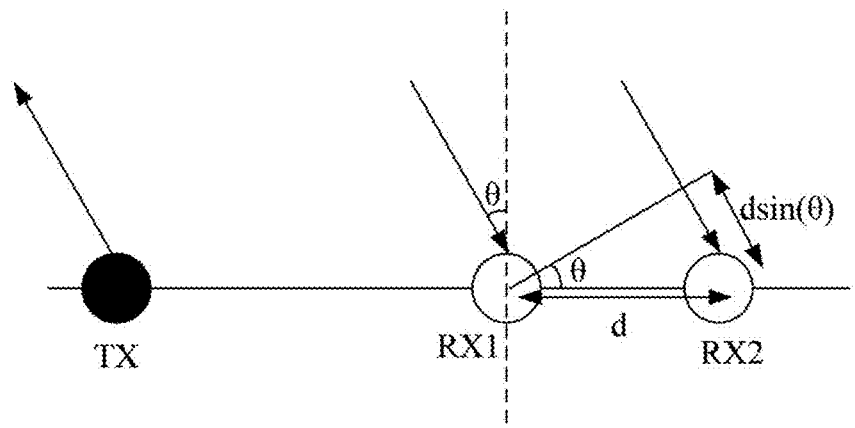
FIG. 1 is a schematic diagram illustrating an architecture of an antenna.

FIG. 1 is a schematic diagram illustrating an architecture of an antenna. As shown in FIG. 1, at least two receiving array elements RX1, RX2 and one transmission array element TX are required to estimate an angle-of-arrival of radar. Assuming that a distance between the two receiving array elements RX1 and RX2 is d, and a signal transmitted by the transmission array element TX is reflected, and is received by the receiving array elements RX1 and RX2 at an angle θ from a normal direction, a phase difference between the receiving array elements RX1 and RX2 due to a path difference d×sin θ is $$\omega_1 = \frac{2\pi}{\lambda} \cdot d \cdot \sin\theta.$$

When the angle is slightly changed by Δθ, the phase difference is $$\omega_2 = \frac{2\pi}{\lambda} \cdot d \cdot \sin(\theta + \Delta\theta),$$

and a difference between the phase differences may be obtained as follows:

$$\Delta\omega = \omega_2 - \omega_1 = \frac{2\pi}{\lambda} \cdot d \cdot (\sin(\theta + \Delta\theta) - \sin\theta) \approx \frac{2\pi}{\lambda} \cdot d \cdot \cos\theta \cdot \Delta\theta.$$

With the increase of the receiving array elements, if the receiving array elements are linearly arranged at equal intervals, phase differences between the receiving array elements and the first receiving array element are also increased at equal intervals. When Fourier transform is performed on the signals of the plurality of receiving array elements, a credible phase difference ω can be obtained.

For N-point FFT (i.e., N receiving antenna data), a minimum resolution is $$\frac{2\pi}{N}.$$

Therefore, in order to be able to distinguish the differences between the phase differences introduced by different incident directions, then $$\Delta\omega > \frac{2\pi}{N}, \text{ i.e., } \frac{2\pi}{\lambda} \cdot d \cdot \cos\theta \cdot \Delta\theta > \frac{2\pi}{N},$$

it can be obtained that $$\Delta\theta > \frac{\lambda}{Nd\cos\theta}.$$

Typically, an antenna spacing is half-wavelength, i.e., $$d = \frac{\lambda}{2},$$

so the angle resolution in the normal direction is $$\theta_{res} = \frac{2}{N}.$$

Thus it can be seen that by increasing the number of the receiving array elements, the angle resolution can be increased significantly.

Figure 2:
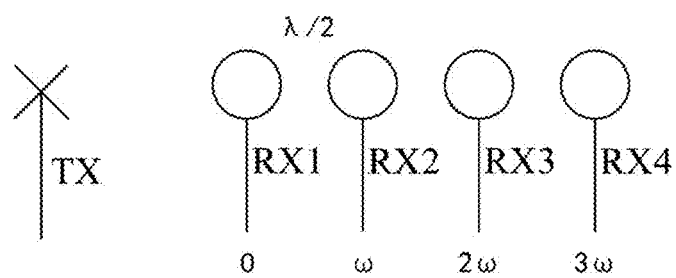
FIG. 2 illustrates an exemplary array antenna.
Figure 3:
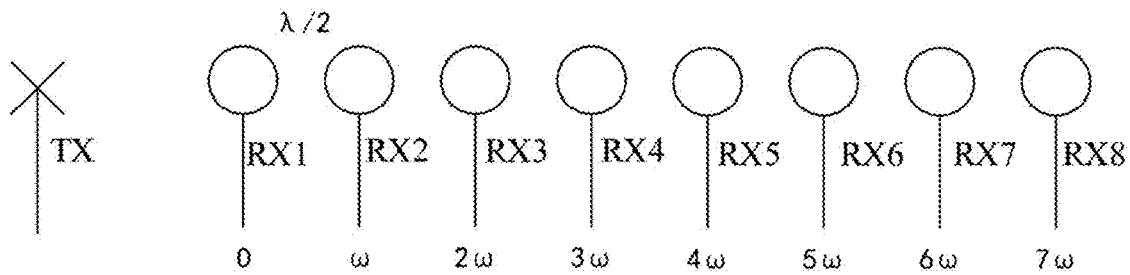
FIG. 3 illustrates another exemplary array antenna.

A conventional method for improving the angle resolution is to simultaneously increase the numbers of receiving array elements and transmission array elements, and each antenna array element corresponds to a radio frequency receiving or transmission channel (link). FIG. 2 illustrates an exemplary array antenna. As shown in FIG. 2, the array antenna includes one transmission array element TX and four receiving array elements RX1, RX2, RX3, and RX4. According to the design that a horizontal spacing of the receiving array elements is λ/2, a horizontal angle resolution in the normal direction in this case may be calculated to be 2/4 rad, which is approximately equal to 57°. If a higher resolution is desired, the number of radio frequency channels is required to be increased proportionally. Supposing to obtain a resolution of one times higher, i.e., 28°, a conventional method is to double the number of the receiving array elements. For example, the array antenna is designed to include one transmission array element TX and eight receiving array elements RX1, RX2, RX3, RX4, RX5, RX6, RX7 and RX8, and as shown in FIG. 3, the horizontal angle resolution in the normal direction is 2/8 rad≈28° in this case. This method of improving the resolution comes at the cost of a proportional increase in the number of the radio frequency channels, which can result in a significant system overhead.

Figure 4:
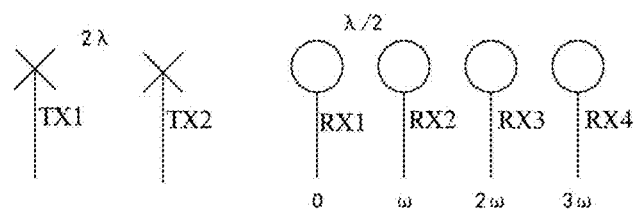
FIG. 4 illustrates another exemplary array antenna.

Another method of improving the resolution is to employ a virtual MIMO technology, and the same effect of doubling the resolution can be realized by adding only an additional transmission unit. As shown in FIG. 4, the array antenna includes two transmission array elements TX and four receiving array elements RX1, RX2, RX3, and RX4, and a spacing between the two transmission array elements is 2λ, and a spacing between every two adjacent receiving array elements is λ/2. The angle resolution of this array antenna is the same as that of the array antenna shown in FIG. 3, but the system overhead of this array antenna is reduced by 25%.

However, during actual use, the requirement on the angle resolution is higher to obtain better using experience. Even if the virtual MIMO technology is employed, the number of channels is also increased, which greatly limits the development of high-angle-resolution scenes.

In view of the above problems, the following technical solutions are provided in the embodiments of the present disclosure. Before describing the embodiments of the present disclosure, it should be noted that in the embodiments of the present disclosure, one of the first array element and the second array element is a transmission array element, and the other of the first array element and the second array element is a receiving array element; and in the following description, it is taken as an example that the first array element is a transmission array element, and the second array element is a receiving array element, but it should be understood that transmission and receiving are relative concepts, that is, when the first array element serves as a receiving array element, the second array element serves as a transmission array element. In addition, when the first array element is a transmission array element, a first link is a transmission link; and when the second array element is a receiving array element, a second link is a receiving link.

In a first aspect, an embodiment of the present disclosure provides an array antenna, which includes M number of transmission array elements, N number of receiving array elements, at least one transmission link, and at least one receiving link; where M≥2 and/or N≥2, and both of M and N are positive integers. Where M≥2, at least two transmission array elements are connected to the corresponding first switch units, respectively, and at least two of the transmission array elements electrically connected to the first switch units are electrically connected to a same transmission link; and/or where N≥2, at least two receiving array elements are connected to the corresponding second switch units, respectively, and at least two of the second array elements electrically connected to the second switch units are electrically connected to a same receiving link.

Specifically, where a plurality of transmission array elements are provided, at least two of the plurality of transmission array elements are electrically connected to the same transmission link through corresponding first switch elements. That is to say, some transmission array elements in the plurality of transmission array elements are correspondingly connected to the same transmission link, and in this case, it is required only to control on/off states of the first switch elements between the transmission array elements and the transmission link, to control which transmission array element the microwave signal input by the transmission link is transmitted through. That is, one transmission link provides the microwave signals for different transmission array elements in a time-sharing way. In this case, the number of transmission link channels can be reduced, thereby reducing cost. Similarly, where a plurality of receiving array elements are provided, at least two of the plurality of receiving array elements are electrically connected to a same receiving link through corresponding second switch elements, and in this case, it is required only to control on/off states of the second switch elements between the receiving array elements and the receiving link, to control which receiving array element an echo signal received by is output through the receiving link to a data processing module for processing. That is, one receiving link outputs signals of different receiving array elements to the data processing module for processing. In this case, the number of receiving link channels can be reduced, thereby reducing the cost.

In some examples, where the plurality of the transmission array elements are provided, the transmission array elements are connected to the first switch units in a one-to-one correspondence. That is, each transmission array element is connected to one corresponding first switch unit, and is electrically connected to the transmission link through this first switch unit. That is to say, the array antenna only includes one transmission link, and in this case, through controlling in time sequence the on/off states of the first switch units only, it can be realized that one transmission link provides microwave signals for all the transmission array elements. It should be noted that, in this case, since only one transmission link is provided, the first switch units cannot be simultaneously turned on, only one first switch can be gated each time, so that the transmission link provides a microwave signal for one transmission array element. In this way, after the receiving array element receives the echo signal, the data processing module can determine which transmission array element transmits the microwave signal. Since only one transmission link is employed in the array antenna, the cost can be greatly reduced.

In some examples, where N=2k, and k≥1, every two receiving array elements are connected to one receiving link, and one second switch unit is connected between each receiving array element and the receiving link electrically connected to the receiving array element. In this case, it is required only to control the on/off states of the second switch elements, to control which receiving array element an echo signal received by is output through the receiving link to the data processing module for processing. In this case, the number of the receiving links is only half of the number of the receiving array elements, and compared with the prior art where the receiving array elements and the receiving links are arranged in a one-to-one correspondence, the number of the receiving links in the embodiment of the present disclosure is reduced by half, so that the cost can be greatly reduced.

Specifically, the N number of receiving array elements are sequentially arranged in a first direction from the $1^{st}$ one to the $N^{th}$ one; the $i^{th}$ and the $(i+N/2)^{th}$ receiving array elements are electrically connected to a same receiving link; where i is selected from a range from 1 to N/2.

In order to better understand the operating principle and effect of the array antenna in the embodiment of the present disclosure, the following description will be given with reference to the following specific examples.

Figure 5:
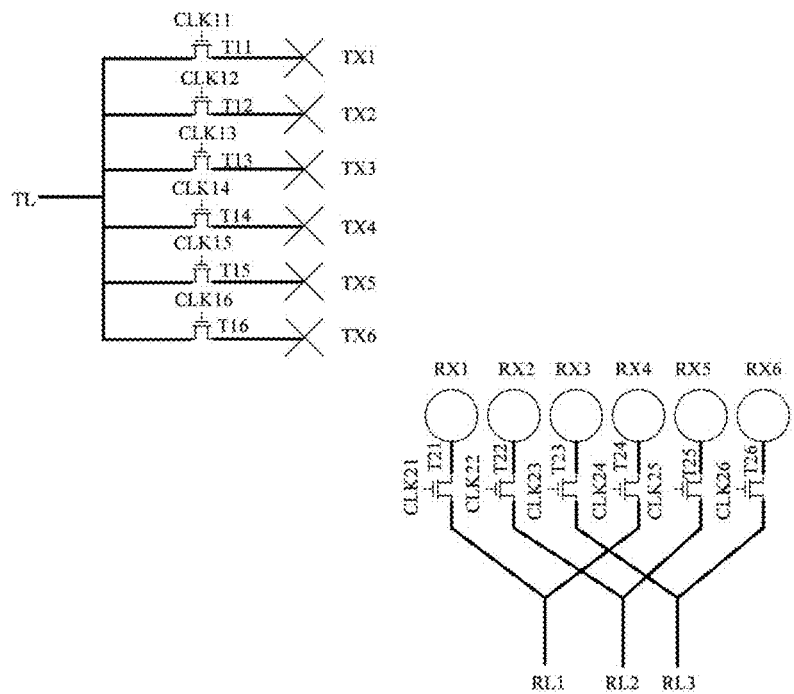
FIG. 5 is a schematic diagram illustrating a structure of an antenna according to an embodiment of the present disclosure.

FIG. 5 is a schematic diagram illustrating an array antenna according to an embodiment of the present disclosure. As shown in FIG. 5, the receiving array elements in the array antenna are arranged side by side along a first direction, and the transmission array elements are arranged side by side along a second direction. In FIG. 5, it is taken as an example only that six receiving array elements and six transmission array elements are provided. The six transmission array elements are denoted by TX1, TX2, TX3, TX4, TX5 and TX6, respectively; and the six receiving array elements are denoted by RX1, RX2, RX3, RX4, RX5 and RX6, respectively. The six transmission array elements are connected to the same transmission link through the corresponding first switch units, respectively. The six first switch units are denoted by T11, T12, T13, T14, T15 and T16, respectively. In this case, a first electrode of the first switch unit T11, a first electrode of the first switch unit T12, a first electrode of the first switch unit T13, a first electrode of the first switch unit T14, a first electrode of the first switch unit T15 and a first electrode of the first switch unit T16 are all electrically connected to the transmission link TL; a second electrode of the first switch unit T11, a second electrode of the first switch unit T12, a second electrode of the first switch unit T13, a second electrode of the first switch unit T14, a second electrode of the first switch unit T15, and a second electrode of the first switch unit T16 are electrically connected to the transmission array elements TX1, TX2, TX3, TX4, TX5, and TX6, respectively; and a control electrode of the first switch unit T11, a control electrode of the first switch unit T12, a control electrode of the first switch unit T13, a control electrode of the first switch unit T14, a control electrode of the first switch unit T15 and a control electrode of the first switch unit T16 are connected to six first clock signal lines CLK11, CLK12, CLK13, CLK14, CLK15 and CLK16, respectively. The six receiving array elements are electrically connected to six second switch units, respectively, and every two of the six switch units are connected to one receiving link. The six second switch units are denoted by T21, T22, T23, T24, T25 and T26, respectively; three receiving links are denoted by RL1, RL2, and RL3, respectively. A first electrode of the second switch unit T21 and a first electrode of the second switch unit T24 are connected to the receiving link RL1, a first electrode of the second switch unit T22 and a first electrode of the second switch unit T25 are connected to the receiving link RL2, a first electrode of the second switch unit T23 and a first electrode of the second switch unit T26 are connected to the receiving link RL3, and a second electrode of T21, a second electrode of the second switch unit T22, a second electrode of the second switch unit T23, a second electrode of the second switch unit T24, a second electrode of the second switch unit T25 and a second electrode of the second switch unit T26 are connected to the receiving array elements RX1, RX2, RX3, RX4, RX5 and RX6, respectively. A control electrode of the second switch unit T21, a control electrode of the second switch unit T22, a control electrode of the second switch unit T23, a control electrode of the second switch unit T24, a control electrode of the second switch unit T25 and a control electrode of the second switch unit T26 are connected to six second clock signal lines CLK21, CLK22, CLK23, CLK24, CLK25 and CLK26, respectively. In this case, the timings of the second clock signal lines CLK21, CLK22, and CLK23 are the same, and the timings of the second clock signal lines CLK24, CLK25, and CLK26 are the same.

Figure 6:
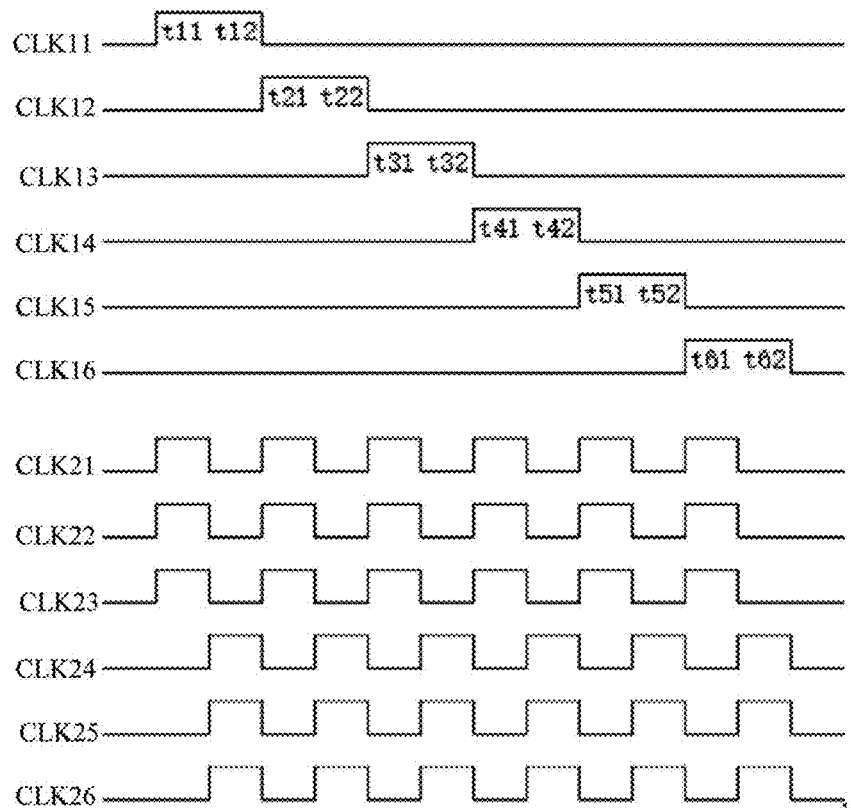
FIG. 6 is a timing diagram of a first clock signal and a second clock signal.

FIG. 6 is a timing diagram of a first clock signal and a second clock signal. As shown in FIG. 6, it is taken as an example in all embodiments of the present disclosure that the first switch units and the second switch units are turned on at a high level. The transmission array element T11 is turned on at the time of t11 and t12 of a first clock signal CLK11, and at this time, the transmission array element TX1 is in an operating state, the second clock signal lines CLK21, CLK22 and CLK23 are written with high levels at the time of t11, the receiving array elements RX1 to RX3 are in a receiving state at the time of t11, the second clock signal lines CLK24, CLK25 and CLK26 are written with high levels at the time of t12, and the receiving array elements RX4 to RX6 are in a receiving state at the time of t12. Since a duration of a single switching is short, it is macroscopically equivalent to that the transmission array element TX1 continuously transmits a signal at the times of t11 and t12, and the receiving array elements RX1 to RX6 continuously receive signals. Similarly, the transmission array elements TX2 to TX6 sequentially transmit signals.

In some examples, where N≥2k, and k≥2, two receiving array elements are electrically connected to one first branch, and the receiving array elements connected to different first branches are different; one second switch unit is electrically connected between each receiving array element and the first branch electrically connected to the receiving array element; the first branches are electrically connected to the receiving links corresponding to the first branches, respectively, and at least two first branches are electrically connected to a same receiving link; and for the first branches electrically connected to the same second link, each first branch and the receiving link electrically connected to the first branch are connected to a third switch unit therebetween. In this way, the number of receiving links can be further reduced, thereby reducing the cost. The following description will be given with reference to specific examples.

Figure 7:
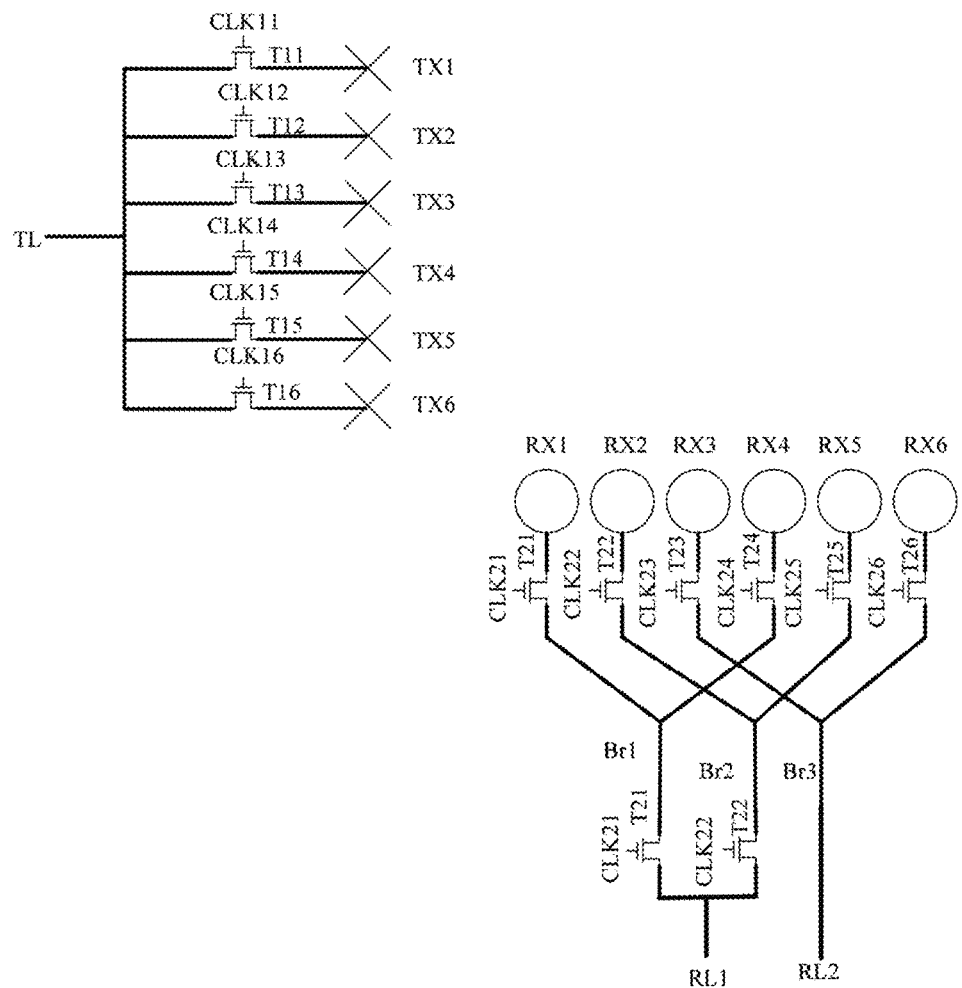
FIG. 7 is a schematic diagram illustrating a structure of another antenna according to an embodiment of the present disclosure.

FIG. 7 is a schematic diagram illustrating an array antenna according to an embodiment of the present disclosure. As shown in FIG. 7, the receiving array elements in the array antenna are arranged side by side along a first direction, and the transmission array elements are arranged side by side along a second direction. In FIG. 7, it is taken as an example only that six receiving array elements and six transmission array elements are provided. The six transmission array elements are denoted by TX1, TX2, TX3, TX4, TX5 and TX6, respectively; and the six receiving array elements are denoted by RX1, RX2, RX3, RX4, RX5 and RX6, respectively. The six transmission array elements are connected to a same transmission link through the corresponding first switch units, respectively. The six first switch units are denoted by T11, T12, T13, T14, T15 and T16, respectively. In this case, a first electrode of the first switch unit T11, a first electrode of the first switch unit T12, a first electrode of the first switch unit T13, a first electrode of the first switch unit T14, a first electrode of the first switch unit T15, and the first electrode of the first switch unit T16 are all electrically connected to a transmission link TL; a second electrode of the first switch unit T11, a second electrode of the first switch unit T12, a second electrode of the first switch unit T13, a second electrode of the first switch unit T14, a second electrode of the first switch unit T15, and a second electrode of the first switch unit T16 are electrically connected to the transmission array elements TX1, TX2, TX3, TX4, TX5, and TX6, respectively; and a control electrode of the first switch unit T11, a control electrode of the first switch unit T12, a control electrode of the first switch unit T13, a control electrode of the first switch unit T14, a control electrode of the first switch unit T15, and a control electrode of the first switch unit T16 are respectively connected to six first clock signal lines CLK11, CLK12, CLK13, CLK14, CLK15 and CLK 16, respectively. The six receiving array elements are electrically connected to six second switch units, respectively, and every two of the six receiving array elements are connected to one first branch. The six second switch units are denoted by T21, T22, T23, T24, T25 and T26, respectively; the three branches are denoted by Br1, Br2 and Br3, respectively. The branches Br1 and Br2 are connected to a same receiving link RL1 through corresponding third switch units T31 and T32, respectively, and the branch Br3 is directly electrically connected to a receiving link RL2. A first electrode of the second switch unit T21 and a first electrode of the second switch unit T24 are connected to the branch Br1, a first electrode of the second switch unit T22 and a first electrode of the second switch unit T25 are connected to the branch Br2, and a first electrode of the second switch unit T23 and a first electrode of the second switch unit T26 are connected to the branch Br3. A second electrode of the second switch unit T21, a second electrode of the second switch unit T22, a second electrode of the second switch unit T23, a second electrode of the second switch unit T24, a second electrode of the second switch unit T25 and a second electrode of the second switch unit T26 are connected to the receiving array elements RX1, RX2, RX3, RX4, RX5 and RX6, respectively. A control electrode of the second switch unit T21, a control electrode of the second switch unit T22, a control electrode of the second switch unit T23, a control electrode of the second switch unit T24, a control electrode of the second switch unit T25, and a control electrode of the second switch unit T26 are connected to six second clock signal lines CLK21, CLK22, CLK23, CLK24, CLK25 and CLK26, respectively. A first electrode of the third switch unit T31 and a first electrode of the third switch unit T32 are connected to the receiving link RL1, a second electrode of a third switch unit T31 and a second electrode of a third switch unit T32 are connected to the branches Br1 and Br2, respectively, and a control electrode of the third switch unit T31 and a control electrode of the third switch unit T32 are connected to third clock signal lines CLK31 and CLK32, respectively. In this case, the timings of the second clock signal lines CLK21, CLK22, and CLK23 are the same, and the timings of the second clock signal lines CLK24, CLK25, and CLK26 are the same. The timing of the third clock signal line CLK31 may be the same as the timing of the second clock signal line CLK23, and the timing of the third clock signal lines CLK32 may be the same as the timing of the second clock signal line CLK 26.

Figure 8:
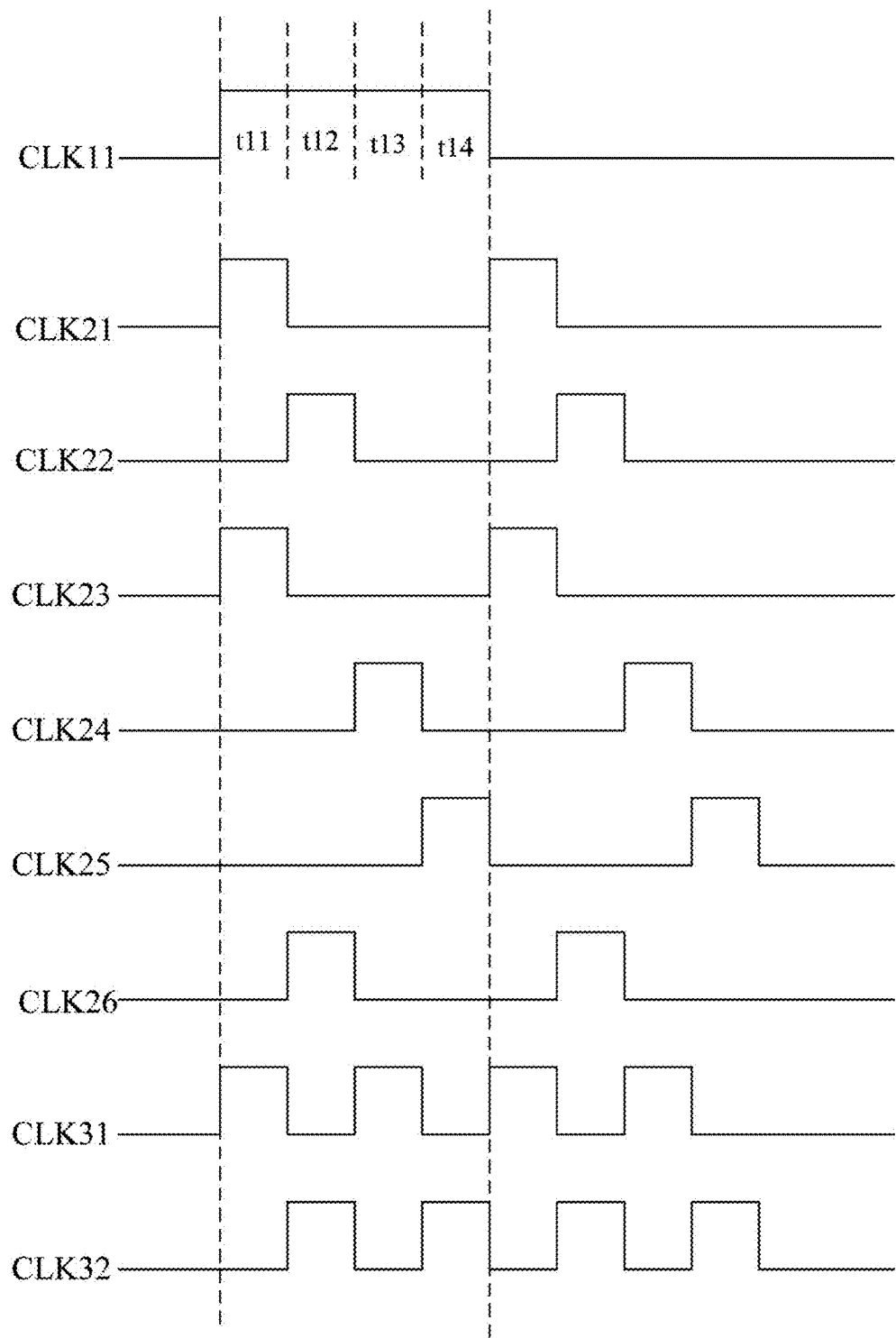
FIG. 8 is a timing diagram of the a first clock signal, a second clock signal, and a third clock signal.

FIG. 8 is a timing diagram of a first clock signal, a second clock signal, and a third clock signal. As shown in FIG. 8, it is taken as an example in all embodiments of the present disclosure that the first switch units, the second switch units, and the third switch units are turned on at a high level. The first switch unit T11 is turned on at times of t11, t12, t13 and t14 of a first clock signal CLK11, and at these times, the transmission array element TX1 is in an operating state. The clock signal lines CLK21, CLK23 and CLK31 are written with a high level at the time of t11, the receiving array elements RX1 and RX3 are in a receiving state at the time of t11; the clock signal lines CLK22, CLK32 and CLK26 are written with a high level at the time of t12, the receiving array elements RX2 and RX6 are in a receiving state at the time of t12; the clock signal lines CLK24 and CLK31 are written with a high level at the time of t13, the receiving array element RX4 is in a receiving state; and the clock signal lines CLK32 and CLK25 are written with a high level at the time of t14, the receiving array element RX5 is in a receiving state. Since a duration of a single switching is very short, it is macroscopically equivalent to that the transmission array element TX1 continuously transmits a signal at the times of t11, t12 and t13, and the receiving array elements RX1 to RX6 continuously receive signals. Similarly, the transmission array elements TX2 to TX6 sequentially transmit signals.

Figure 9:
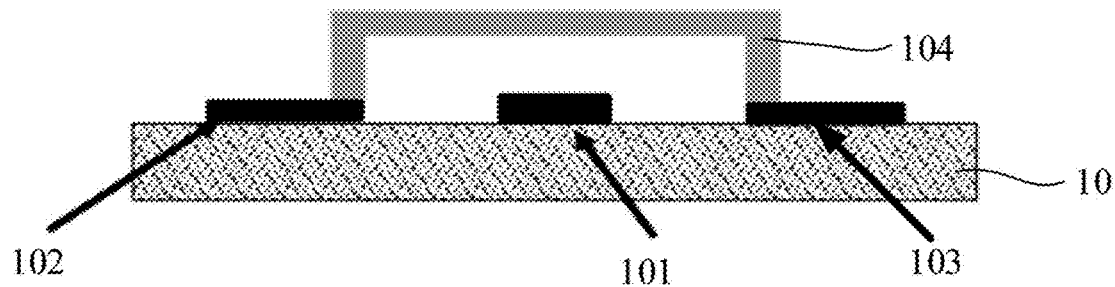
FIG. 9 illustrates an exemplary MEMS switch.

In some examples, each of the first, second, and third switch units may be any one of a thin film transistor (TFT), a photodiode (PIN), or a micro-electro mechanical system switch (MEMS switch). Preferably, in the embodiment of the present disclosure, the first switch units, the second switch units, and the third switch units may be MEMS switches. The reason why the MEMS switch is selected is that the MEMS switch can be formed at the same time as the transmission array element and the receiving array element are formed without separately adding a process step. FIG. 9 illustrates a structure of a MEMS switch, which includes, as shown in FIG. 9, a first electrode 102 and a second electrode 103 formed on a first dielectric substrate 10, a driving electrode 101 located between the first electrode 102 and the second electrode 103, and a membrane bridge structure 104 located above a layer where the first electrode 102 and the second electrode 103 are located, where two connecting arms of the membrane bridge structure 104 are in contact with the first electrode 102 and the second electrode 103, respectively. The first electrode 102, the second electrode 103, and the driving electrode 101 of the MEMS switch serve as a first electrode, a second electrode, and a control electrode of the first switch unit (second switch unit/third switch unit), respectively. The driving electrode 101 and the second electrode 103 may be electrically connected to a printed circuit board (PCB) through a bonding process, to control the driving electrode through a driving chip on the PCB, thereby controlling the on/off state of the MEMS switch.

In the embodiment of the present disclosure, both the receiving array element and the transmission array element may be a radiation patch, a dipole, etc. The embodiments of the present disclosure do not limit the types of the receiving array element and the transmission array element.

Figure 10:
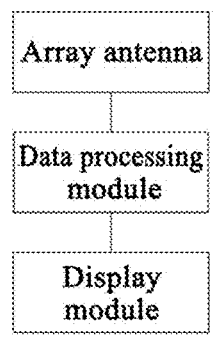
FIG. 10 is a schematic diagram illustrating a man-machine interaction apparatus according to an embodiment of the present disclosure.

In a second aspect, FIG. 10 is a schematic diagram illustrating a man-machine interaction apparatus in an embodiment of the present disclosure. As shown in FIG. 10, an embodiment of the present disclosure further provides a man-machine interaction apparatus, which includes the above described array antenna, a data processing module, and a display module. Specifically, the transmission array element in the array antenna is used for transmitting a radar signal, and the receiving array element in the array antenna is used for receiving an echo signal reflected; and the data processing module is used for determining a human body action and a control instruction corresponding to the human body action according to the radar signal and the echo signal and outputting the control instruction. The display module is used for displaying the determined human body action and/or control instruction.

In some examples, the data processing module is specifically configured to mix the radar signal and the echo signal, perform analysis processing on the mixed signal to obtain information of reflecting object, identify a human body action according to the information of reflecting object, and determine the control instruction corresponding to the human body action. The information of reflecting object includes at least one of distance information, speed information, and angle-of-arrival information. In some embodiments, the radar signal is a Frequency Modulated Continuous Wave (FMCW) signal.

Specifically, millimeter wave radars are divided into two categories, namely a pulse radar and a continuous wave radar, according to the types of transmitted signals, where the pulse radar transmits periodic high-frequency pulses, and the continuous wave radar transmits a continuous wave signal. The continuous wave signal may include a Continuous Wave (CW) signal or a frequency modulated continuous wave signal, and the frequency modulation mode of the frequency modulated continuous wave signal includes a triangular wave modulation, a sawtooth wave modulation, a code modulation or a noise frequency modulation. In the foregoing embodiments, for the case that the radar signal is a frequency modulated continuous wave signal, the array antenna transmits an frequency modulated continuous wave signal with a frequency changing within a sweep period, a certain difference exists between frequencies of the echo signal reflected by an object and the transmitted radar signal, and distance information between the object and the array antenna, and the like can be obtained by measuring the frequency difference.

In some examples, a correspondence between human body actions and control instructions is acquired or configured in advance, where a one-to-one correspondence between human body actions and control instructions may be established, or a correspondence between human body actions and control instructions of a single terminal device may be established, or a correspondence between a single human body action and control instructions of different terminal devices may be established.

In some examples, the human interaction apparatus further includes a Printed Circuit Board (PCB). Accordingly, in some embodiments, the data processing module is arranged on the printed circuit board, and signal transmission is performed between the array antenna and the data processing module through a flexible cable. In order to obtain a low signal loss, an Anisotropic Conductive Film (ACF) adhesive having a gold ball with a large particle diameter (e.g., a diameter greater than 10 um) may be employed to perform bonding. Alternatively, in some embodiments, the data processing module is arranged on the printed circuit board, and the array antenna is packaged inside the data processing module, where the printed circuit board may be a high frequency circuit board, and the array antenna may be packaged inside the data processing module based on an Antenna in Package (AiP) technology. In some embodiments, the human interaction apparatus is installed inside a terminal device, and in this case, it is required to form a hole in a sensing area corresponding to the array antenna at a corresponding installation position in the terminal device, to reserve a transmission path, so that a metal shell of the terminal device is prevented from blocking transmission of the millimeter wave.

In some examples, the data processing module and the array antenna form a millimeter wave radar sub-system, and accordingly, the display module corresponds to a display sub-system.

In some examples, the display module includes a routing gateway unit, which is used for receiving media data. Correspondingly, the display module is further used for displaying according to the media data received by the routing gateway unit.

In some examples, the display module further includes a display device, a display driving unit, a timing control unit, a signal adaptation unit, and the like. The media data received by the routing gateway unit is subjected to code stream decoding by the signal adaptation unit, and is subjected to driving control by the timing control unit according to a certain timing logic, to form a display effect on the display device.

The man-machine interaction apparatus in the embodiment of the disclosure forms a millimeter wave radar based on the array antenna and the data processing module, realizes non-contact control through the millimeter wave radar, determines a corresponding control instruction through capturing and identifying human body actions, and sends the control instruction to the terminal device, so that the terminal device executes a corresponding command response, to realize interaction operation.

Figure 11:
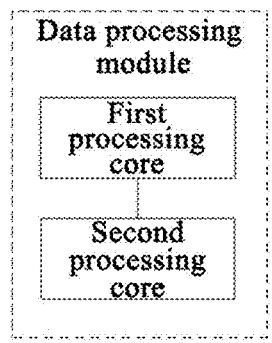
FIG. 11 is a schematic diagram illustrating a structure of a data processing module according to an embodiment of the present disclosure.

FIG. 11 is a schematic diagram illustrating a structure of a data processing module according to an embodiment of the present disclosure. As shown in FIG. 11, the data processing module is a specific alternative embodiment of the data processing module shown in FIG. 10, and specifically, the data processing module includes a first processing core and a second processing core.

The first processing core is used for performing analysis operation according to a signal obtained by mixing the radar signal and the echo signal, and generating the information of reflecting object, where the analysis operation includes at least one of One-Dimensional Fast Fourier transform (1D FFT), Two-Dimensional Fast Fourier transform (2D FFT) and calculation of Angle-Of-Arrival (AOA). The distance information and the speed information can be correspondingly obtained through one-dimensional Fourier transform and two-dimensional Fourier transform, respectively, and the information of angle-of-arrival can be obtained correspondingly through the calculation of angle-of-arrival.

In some embodiments, the first processing core is further configured to determine a valid echo signal based on a peak search algorithm and a Constant False-Alarm Rate (CFAR) algorithm, before performing the calculation of angle-of-arrival.

The second processing core is used for carrying out chirp control on the radar signal, pre-training and generating a human body action recognition network, recognizing human body actions through the human body action recognition network according to the information of reflecting object, and determining a corresponding control instruction, where chirp refers to the characteristic that the instantaneous frequency of the signal changes with time. In some embodiments, the radar signal is a frequency modulated continuous wave signal, and accordingly, the second processing core is used for configuring chirp parameters of the frequency modulated continuous wave signal. In some embodiments, the human body action recognition network may be independently configured as a gesture recognition network for accurate recognition of gesture motions. In some embodiments, the human body action recognition network is a convolutional neural network, and may be based on Torch architecture, Pytorch architecture, VGG architecture, and the like. The convolutional neural network has fewer parameters, a fast determination speed, and high determination accuracy, and is particularly suitable for recognizing an image. It should be noted that the above recognition network may employ a convolutional neural network model or other neural network models, which are applicable to the technical solution of the present disclosure, and will not be repeated herein.

In some examples, the first processing core may employ a DSP processing core, and the second processing core may employ an ARM processing core.

Figure 12:
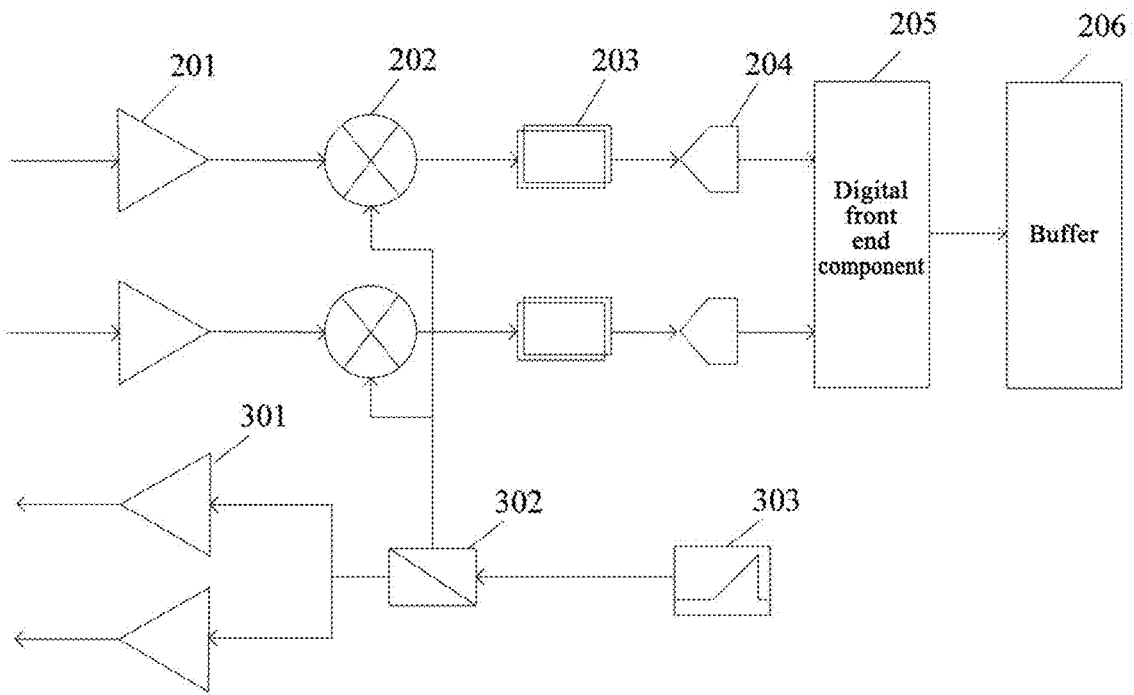
FIG. 12 is an equivalent circuit diagram of another data processing module according to an embodiment of the present disclosure.

FIG. 12 is an equivalent circuit diagram of another data processing module according to an embodiment of the present disclosure. As shown in FIG. 12, the data processing module is a specific alternative embodiment of the data processing module shown in FIG. 10. Specifically, the data processing module includes a low noise amplifier 201, a mixer 202, an intermediate frequency amplifier 203, an analog-to-digital converter 204, a digital front end component 205 (decimation filter), a buffer 206, a power amplifier 301, a power divider 302, and a waveform generator 303. The arrows in the figure show directions in which signals are transmitted.

The low noise amplifier 201, the mixer 202, the intermediate frequency amplifier 203, the analog-to-digital converter 204, the digital front end component 205 and the buffer 206 are sequentially connected together. The waveform generator 303, the power divider 302 and the power amplifier 301 are sequentially connected together. Input terminals of the mixer 202 are connected to the low noise amplifier 201 and the power divider 302. An input terminal of the low noise amplifier 201 is connected to the array antenna, and an output terminal of the power amplifier 301 is connected to the array antenna. The data processing module may include a plurality of transmission and receiving links, that is, may include a plurality of groups of low noise amplifier 201, mixer 202, intermediate frequency amplifier 203, analog-to-digital converter 204 (a case including two groups is exemplarily shown in the figure) on a receiving side, and may include a plurality of power amplifiers 301 (a case including two power amplifiers is exemplarily shown in the figure) on a transmission side. In some embodiments, a phase shifter is further connected between each power amplifier 301 and the power divider 302. In some embodiments, a filter is further connected between each mixer 202 and the intermediate frequency amplifier 203 corresponding to the mixer 202.

The waveform generator 303 generates radar signals, and a part of the radar signals is sent to the mixer 202 through the power divider 302, and a part of the radar signals is sent to the power amplifier 301 through the power divider 302, in turn to the array antenna through the power amplifier 301, and is sent out by a corresponding antenna element in the array antenna. The corresponding antenna element in the array antenna receives an echo signal reflected after the radar signal encountering an object, the received echo signal is amplified by the low noise amplifier 201, then is mixed by the mixer 202 with the part of output of the power divider 302, to obtain an intermediate frequency signal, and the intermediate frequency signal is converted into corresponding data by the intermediate frequency amplifier 203, the analog-to-digital converter 204 and the digital front end component 205, and is stored in the buffer 206.

Figure 13:
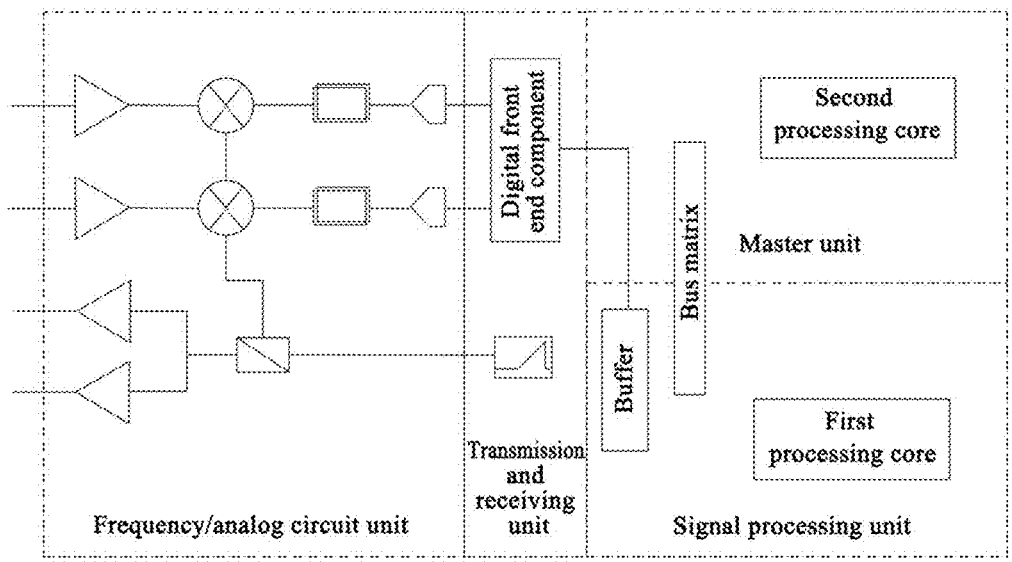
FIG. 13 is a schematic diagram illustrating a structure of another data processing module according to an embodiment of the present disclosure.

FIG. 13 is a schematic diagram illustrating a structure of another data processing module according to an embodiment of the present disclosure. As shown in FIG. 13, the data processing module is a specific alternative embodiment of the data processing module shown in FIGS. 11 and 12. Specifically, the data processing module includes a low noise amplifier, a mixer, an intermediate frequency amplifier, an analog-to-digital converter, a digital front end component, a buffer, a power amplifier, a power divider, a waveform generator, a first processing core, and a second processing core.

Based on a function of each component, the data processing module may be divided into a plurality of units, including a radio frequency/analog circuit (RF/Analog) unit, a Transmission and Receiving (TR) unit, a signal processing (DSP) unit and a master unit. As shown in FIG. 13, the radio frequency/analog circuit unit includes the low noise amplifier, the mixer, the intermediate frequency amplifier, the analog-to-digital converter, the power amplifier, and the power divider. The transmission and receiving unit includes the digital front end component and the waveform generator. The signal processing unit includes the buffer and the first processing core. The master unit includes the second processing core. The components in the master unit and the signal processing unit may perform communication and process control based on a bus matrix, and directions in which signals are transmitted inside the radio frequency/analog circuit unit may be referred to FIG. 12.

In some examples, the radio frequency/analog circuit unit further includes a general purposed analog-to-digital converter (GPADC), an oscillator (OSC), a temperature controller, and the like. The signal processing unit further includes a Cyclic Redundancy Check (CRC) component, a Direct Memory Access (DMA) component, a Low Voltage Differential Signaling (LVDS) interface, a Hardware-in-the-Loop (HIL) component, a radar data memory, and a hardware accelerator connected to the buffer. The master unit further includes a direct memory access component, a Serial Peripheral Interface (SPI), a Quad Serial Peripheral Interface (QSPI), a bus interface, and a debugging serial port. A mailbox module based on a mailbox synchronous communication mechanism is further arranged between the master unit and the signal processing unit.

In some examples, the data processing module may employ an IWR6843 chip, a VYYR7201-A0 chip, or the like.

In some examples, the data processing module may alternatively include only the low noise amplifier, the mixer, the intermediate frequency amplifier, the power amplifier, and the power divider, for example, employs a BGT60TR13 chip. The other components such as the analog-to-digital converter, the digital front end component, the buffer, and the waveform generator are required to be additionally provided.

Therefore, based on the data processing module in each embodiment described above, it can be realized that corresponding signals and data are processed based on a plurality of processing cores. The first processing core performs a series of analysis operations on the intermediate-frequency signals, and the second processing core realizes human body action recognition through a trainable human body action recognition network, so that the accuracy of human body action recognition is improved.

In some examples, the display module includes a display device in which an array antenna is integrated. The array antenna includes a reference electrode layer, a dielectric layer, and a radiation electrode layer, which are sequentially stacked together.

In some examples, the reference electrode layer is also called a ground layer and is connected to a ground signal (which may be a direct current low level signal). The reference electrode layer can lead out static electricity and lightning signals generated during use, so as to prevent the antenna from being damaged due to breakdown and prevent the performance of the antenna from affected. The radiation electrode layer is also called as a radiation layer, and can convert an electrical signal input through the transmission line into an electromagnetic wave signal and radiate the electromagnetic wave signal outwards, or can convert an external electromagnetic wave signal into an electrical signal and output the electrical signal to the terminal device through the transmission line, so that the effect of wireless signal transmission is realized. The dielectric layer may be a dielectric substrate, is located between the reference electrode layer and the radiation electrode layer, may be made of a low-loss dielectric material, and serves in supporting the reference electrode layer and the radiation electrode layer. In some embodiments, the integration of the array antenna into the display device may include in-cell integration, on-cell integration, or the like. The on-cell integration further includes integration above the cell, integration under the cell, or the like.

In some examples, materials of the reference electrode layer and the radiation electrode layer each include aluminum, copper or molybdenum.

In some examples, the man-machine interaction apparatus further includes a printed circuit board, and the first link and the second link are bonded and connected to the printed circuit board. Specifically, the printed circuit board includes a first printed circuit and a second printed circuit board; the first link is bonded and connected to the first printed circuit board; and the second link bonded and connected to the second printed circuit board.

In some examples, if the array antenna metal is of a metal mesh structure, then the array antenna may alternatively be located in the display area. This will not affect the display, and a narrow bezel design can be achieved.

In some examples, the display device has a display area Q1 and a peripheral area Q2 surrounding the display area. The array antenna may be arranged at any position in the display area Q1 and the peripheral area Q2. In some embodiments, in order to reduce signal transmission loss, the array antenna is arranged at a position close to an edge of the display device, to shorten a length of the signal lead.

Specific examples of integrating the transmission array elements and the receiving array elements of the array antenna in the peripheral area of the display device are given below.

Figure 14:
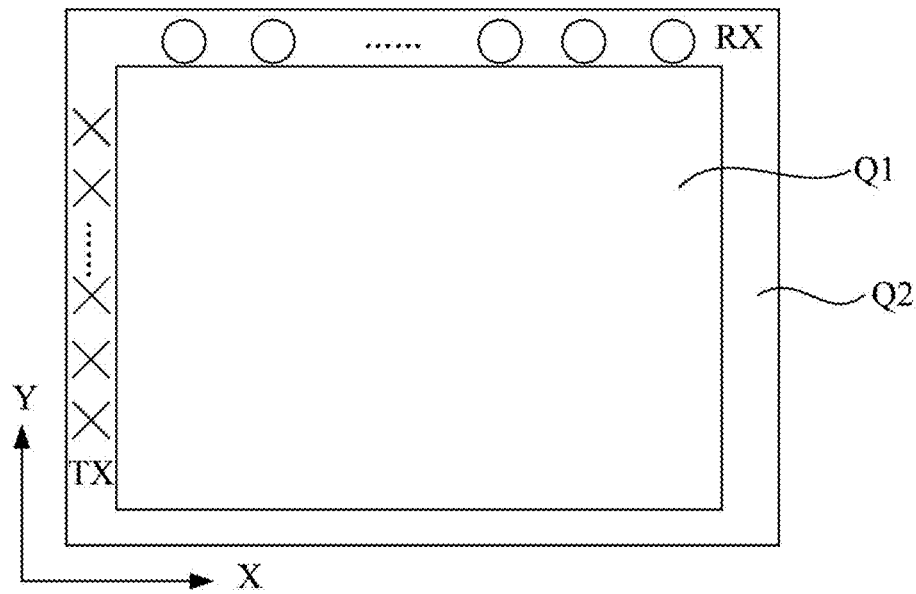
FIG. 14 is a schematic diagram illustrating an array antenna integrated in a peripheral area of a display device according to an embodiment of the present disclosure.
Figure 15:
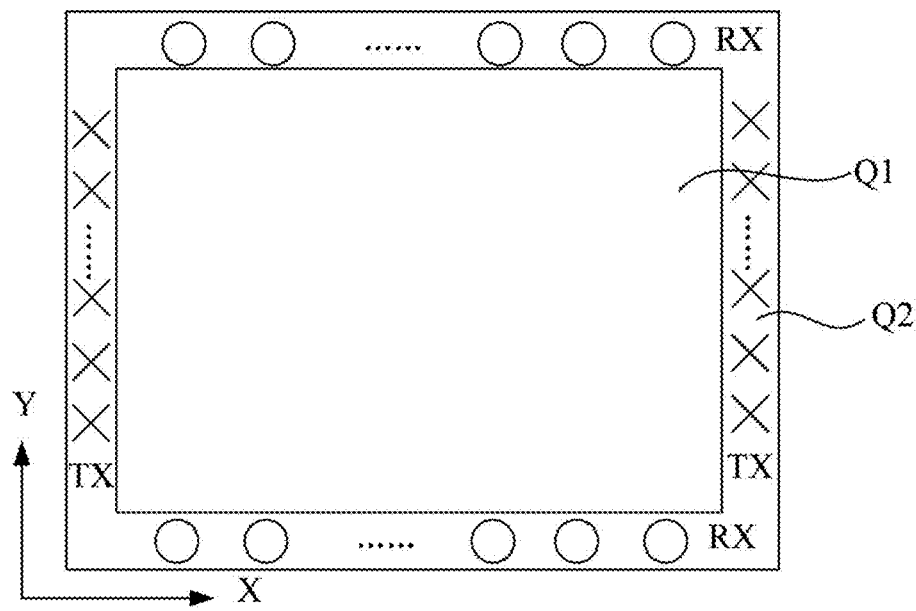
FIG. 15 is a schematic diagram illustrating another array antenna integrated in a peripheral area of a display device according to an embodiment of the present disclosure.

FIG. 14 is a schematic diagram illustrating an array antenna integrated in a peripheral area of a display device according to an embodiment of the present disclosure. As shown in FIG. 14, if the number of the transmission array elements in one dimension along the second direction is M, and the number of the receiving array elements in one dimension along the first direction is N, the antenna can be equivalent to a two-dimensional array antenna with M number of rows and N number of columns, and the horizontal angle resolution and the vertical angle resolution are 2/N and 2/M, respectively. The arrangement and numbers of the transmission antenna elements and the receiving antenna elements can also be reversely deduced according to the angle resolutions. The peripheral area Q2 includes a first area and a second area that are opposite to each other in the first direction, and a third area and a fourth area that are opposite to each other in the second direction. The transmission array elements are arranged in the first area and arranged side by side along the second direction; and the receiving array elements are arranged in the third area and are arranged side by side along the first direction. Alternatively, the transmission array elements may be arranged in the second area and arranged side by side along the second direction; and the receiving array elements are arranged in the fourth area and are arranged side by side along the first direction. The receiving array elements and the transmission array elements are all arranged in the peripheral area Q2 of the display device, and are arranged at equal intervals, so that the transmission loss of signals can be greatly reduced. In addition, the arrangement of one row and one column also enables to select whether to arrange the array antenna into the display area, thereby reducing the design difficulty. Alternatively, other arrangements may also be adopted to obtain a specific effect, for example, as shown in FIG. 15, a surrounding arrangement may be adopted, that is, the first area and the second area are both provided with the transmission array elements, and the third area and the fourth area are both provided with the receiving array elements. Thus, the increase of the bezel due to the first switch units and the second switch units may be reduced. Alternatively, there are other arrangements that may be employed, including any combination of the arrangements in the figures, which are not listed herein.

The man-machine interaction apparatus includes the fields which require non-contact monitoring and interactive perception, such as smart home, vehicle-mounted device, health monitoring device, consumer electronics device, and the like.

The man-machine interaction apparatus according to the embodiment of the disclosure is described in detail in conjunction with practical applications. Taking an application scene of smart home as an example, the man-machine interaction apparatuses are various corresponding smart home devices. With the interaction apparatus according to the embodiment of the present disclosure, non-contact control on a single or a plurality of smart home devices can be realized. The terminal device may include a household television, an air conditioner, an electric lamp, an electronic curtain, a water heater, a range hood, a smart range, a refrigerator, a stereo, an electronic door, or the like. The man-machine interaction apparatus may be arranged independently or arranged in the corresponding terminal device, and can establish one-to-one control, one-to-many control, or many-to-one control on the terminal devices.

It is taken as an example that the terminal device is a range hood, and the man-machine interaction apparatus is arranged in the range hood to perform one-to-one control.

The man-machine apparatus includes an array antenna, a data processing module and a display module. In the array antenna, the transmission array element is used for transmitting a radar signal, and the receiving array element is used for receiving a reflected echo signal. Specifically, the radar signal is a frequency modulated continuous wave signal. The data processing module includes a low noise amplifier, a mixer, an intermediate frequency amplifier, an analog-to-digital converter, a digital front end component, a buffer, a power amplifier, a power divider, a waveform generator, a first processing core and a second processing core. The display module is used for displaying the determined human body action and/or control instruction, and displaying an interaction interface of the range hood. The man-machine interaction apparatus and the range hood share the display module. The array antenna is integrated in the display device of the display module, and includes in-cell integration, on-cell integration, or the like. The on-cell integration includes integration above the cell, integration under the cell, or the like.

Firstly, the waveform generator in the data processing module generates the radar signal, and sends the radar signal to the mixer and the power amplifier through the power divider. The power amplifier processes the signal and sends the processed signal to the array antenna, to be sent outward. The low noise amplifier receives the echo signal received by the array antenna. The frequency mixer mixes the radar signal with the echo signal. The mixed signal is sequentially processed through the intermediate frequency amplifier, the analog-to-digital converter, and the digital front end component, and corresponding data is stored in the buffer. The data is performed by the first processing core analysis operations, including one-dimensional Fourier transform, two-dimensional Fourier transform, angle-of-arrival calculation, and the like, to generate information of reflecting object. the second processing core identifies gesture actions through a pre-trained gesture identification network based on the information of reflecting object, determines a control instruction expected by a user for the range hood, and sends the control instruction to the range hood through a corresponding interface. The range hood executes corresponding actions; specifically, for example, when a gesture action is detected as staying in a defined sensing area for more than 3 seconds, the range hood is turned on, when a gesture action is detected as clockwise or counterclockwise rotation, the wind power of the range hood is adjusted, and when a gesture action is detected as left-right waving, a display interface is controlled to turn a page, and the like.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the protection scope of the present disclosure.

What is claimed is:

1. An array antenna, comprising M number of first array elements, N number of second array elements, at least one first link and at least one second link, wherein both of M and N are positive integers; wherein M≥2, at least two of the M number of first array elements are connected to corresponding first switch units, respectively; and at least two of the first array elements electrically connected to the first switch units are electrically connected to a same first link; and N≥2, at least two of the N number of second array elements are connected to corresponding second switch units, respectively; and at least two of the second array elements electrically connected to the second switch units are electrically connected to a same second link, wherein N=2k, and k≥1, k is an integer, every two of the N number of second array elements are electrically connected to a corresponding one of the at least one second link, the second array elements connected to different second links are different, and a corresponding one of the second switch units is electrically connected between each of the N number of second array elements and the second link, wherein the N number of second array elements are sequentially arranged along a first direction from a 1st one to an Nth one; and an ith second array element and an (i+N/2)th second array element are electrically connected to a same second link, where i is an integer in a range from 1 to N/2.

2. The array antenna according to claim 1, wherein all of the M number of first array elements are electrically connected to a same first link, and a corresponding one of the first switch units is electrically connected between each of the M number of first array elements and the first link.

3. The array antenna according to claim 1, wherein the first switch units and the second switch units each comprise any one of a thin film transistor, a micro-electro mechanical system switch, or a photodiode.

4. The array antenna according to claim 1, wherein the first array elements and the second array elements each comprise a radiation patch or a dipole.

5. A man-machine interaction apparatus, comprising the array antenna according to claim 1.

6. The man-machine interaction apparatus according to claim 5, further comprising:

a data processing module configured to determine a human body action and a corresponding control instruction according to a radar signal transmitted by the array antenna and an echo signal received, and to output the control instruction; and a display module configured to display the determined human body action or the control instruction.

7. The man-machine interaction apparatus according to claim 6, wherein the display module comprises a display device, and the array antenna is integrated in the display device.

8. The man-machine interaction apparatus according to claim 7, wherein the display device has a display area and a peripheral area surrounding the display area; and the array antenna is integrated in the peripheral area.

9. The man-machine interaction apparatus according to claim 8, wherein the peripheral area comprises a first area and a second area opposite to each other along a first direction, and a third area and a fourth area opposite to each other along a second direction; the M number of first array elements are in the first area and arranged side by side along the second direction; and the N number of second array elements are in the third area and arranged side by side along the first direction.

10. The man-machine interaction apparatus according to claim 8, wherein the peripheral area comprises a first area and a second area opposite to each other along a first direction, and a third area and a fourth area opposite to each other along a second direction; the first area and the second area are both provided with the first array elements, and the third area and the fourth area are both provided with the second array elements.

11. The man-machine interaction apparatus according to claim 7, wherein the display device has a display area and a peripheral area surrounding the display area; the array antenna comprises a metal mesh structure; and the array antenna is in the display area.

12. The man-machine interaction apparatus according to claim 6, wherein the data processing module comprises a first processing core and a second processing core;
the first processing core is configured to perform analysis operations according to a signal obtained by mixing the radar signal and the echo signal, and generate information of reflecting object, wherein the analysis operations comprise at least one of one-dimensional Fourier transform, two-dimensional Fourier transform, and angle-of-arrival calculation; and
the second processing core is configured to perform chirp control on the radar signal, pre-train and generate a human body action recognition network, recognize the human body action through the human body action recognition network according to the information of reflecting object, and determine the corresponding control instruction.

13. The man-machine interaction apparatus according to claim 6, wherein the data processing module comprises a low noise amplifier, a mixer, an intermediate frequency amplifier, an analog-to-digital converter, a digital front end component, a buffer, a power amplifier, a power divider and a waveform generator;
the low noise amplifier, the mixer, the intermediate frequency amplifier, the analog-to-digital converter, the digital front end component and the buffer are sequentially connected together;
the waveform generator, the power divider and the power amplifier are sequentially connected together; and
an input terminal of the mixer is further connected to the power divider, an input terminal of the low noise amplifier is connected to the array antenna, and an output terminal of the power amplifier is connected to the array antenna.

14. The man-machine interaction apparatus according to claim 6, further comprising a printed circuit board, wherein the first link and the second link are bonded to the printed circuit board.

15. The man-machine interaction apparatus according to claim 14, wherein the printed circuit board comprises a first printed circuit and a second printed circuit board; the first link is bonded and connected to the first printed circuit board; and the second link is bonded and connected to the second printed circuit board.

16. The man-machine interaction apparatus according to claim 14, wherein the man-machine interaction apparatus comprises any one of smart home device, vehicle-mounted device, health monitoring device and consumer electronics device.

* * * * *